United States Patent [19]
Leiber

[11] 4,374,421
[45] Feb. 15, 1983

[54] ANTI SKID CONTROL SYSTEM

[75] Inventor: Heinz Leiber, Leimen, Fed. Rep. of Germany

[73] Assignee: Robert Bosch GmbH, Stuttgart, Fed. Rep. of Germany

[21] Appl. No.: 200,632

[22] Filed: Oct. 27, 1980

Related U.S. Application Data

[63] Continuation of Ser. No. 19,522, Mar. 12, 1979, abandoned.

[30] Foreign Application Priority Data

Mar. 18, 1978 [DE] Fed. Rep. of Germany ....... 2812000

[51] Int. Cl.³ .......................... G06F 15/20; B60T 8/02
[52] U.S. Cl. ..................................... 364/426; 303/96; 303/111; 361/238
[58] Field of Search .................. 364/426; 303/96, 105, 303/106, 111; 361/238

[56] References Cited

U.S. PATENT DOCUMENTS

| | | | |
|---|---|---|---|
| 3,680,655 | 8/1972 | Beyerlein et al. | 303/96 X |
| 4,005,911 | 2/1977 | Klatt et al. | 303/111 |
| 4,077,675 | 3/1978 | Leiber et al. | 303/106 X |

Primary Examiner—Jerry Smith
Attorney, Agent, or Firm—Edwin E. Greigg

[57] ABSTRACT

An anti skid system for a wheeled vehicle, in which each of the two wheels on opposite sides of a vehicle axle is equipped with an independent brake pressure control system, each of which includes a wheel speed transducer, a processor and a brake force control valve assembly. In order to prevent the occurrence of yawing moments when the road surface adhesion coefficients are different for the two wheels, the control channels are interconnected in such a way that when one of the wheels exhibits a tendency to lock up, the rate of increase of the braking pressure in the opposite wheel is reduced. This reduction may be prevented if the other wheel also exhibits a tendency to lock up.

7 Claims, 2 Drawing Figures

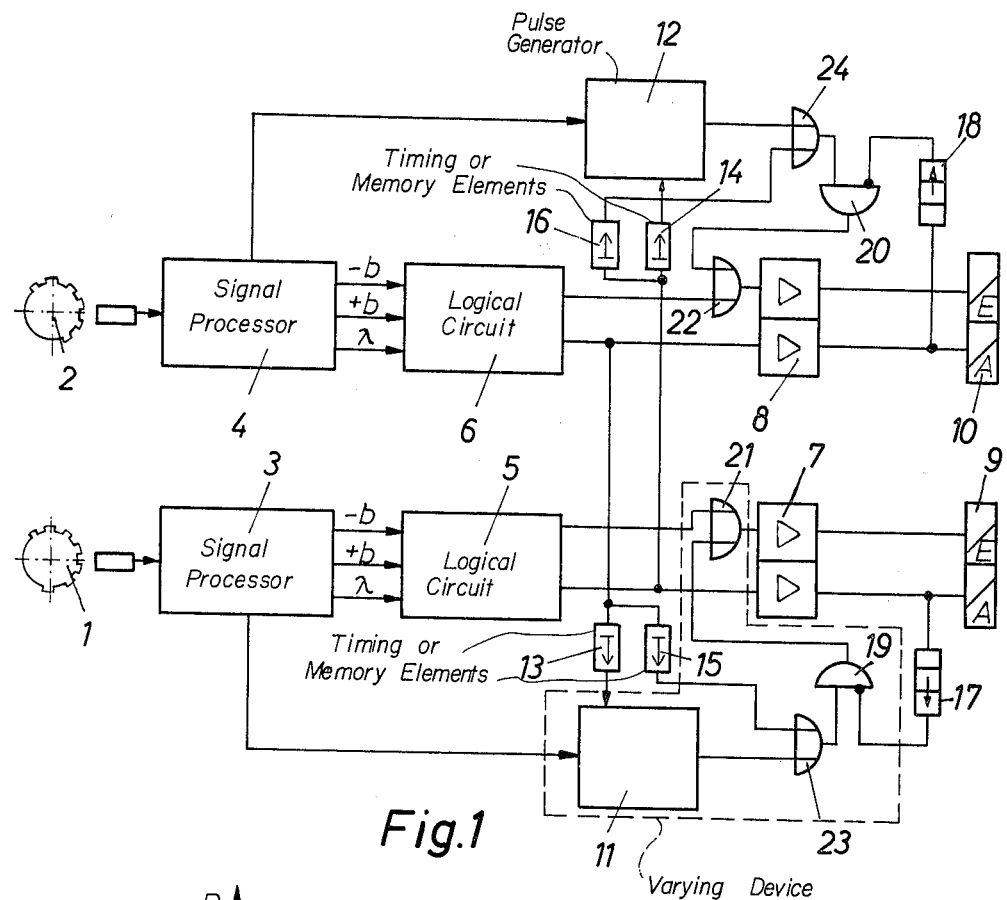
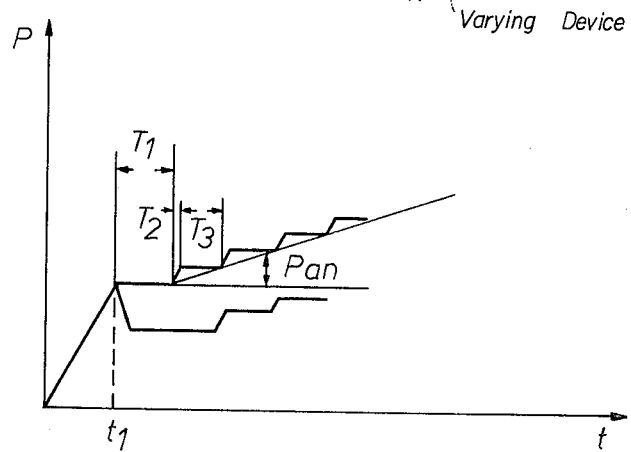

ANTI SKID CONTROL SYSTEM

This is a continuation of application Ser. No. 19,522 filed Mar. 12, 1979, and now abandoned.

FIELD OF THE INVENTION

The invention relates to anti skid control systems, also called anti wheel lock control systems, in which a transducer is associated with the individual wheels on a vehicle axle. The transducer signals are fed to a processor circuit which controls the brake pressure applied to the various wheels. More particularly, the invention relates to systems in which the rate of change of the pressure, i.e., the pressure gradient, is variable.

An anti skid system in which the gradient of the brake pressure increase is lowered under certain conditions is described in the German Offenlegungsschrift No. 24 60 904. In the system described there, the brake pressure reduction is followed by a pressure increase with a steep gradient followed by a pressure increase with a lower gradient. The duration of the rapid-pressure increase can be changed independently of the pressure increase in the preceding control cycle. The purpose of changing the pressure gradient in the known system is to adapt the brake pressure as rapidly and as smoothly as possible to the optimum brake pressure. The known system can be used to control the brake pressure at each wheel of an axle independently of any other wheel.

OBJECT AND SUMMARY OF THE INVENTION

It is a principal object of the present invention to provide an anti skid system (anti wheel lock control system) which is so constructed that when a vehicle travels over asymmetric road surfaces, i.e., surface in which wheels on opposite sides of the vehicle encounter different road adhesion coefficients, yaw moments are prevented during braking.

This object is attained according to the invention by coupling the control channels associated with opposite wheels on an axle in such a manner that when one of the wheels of an axle tends to lock up, the rate of pressure increase at the other wheel is diminished.

When vehicles travel over irregular road surfaces in which the coefficient of road adhesion may be different from one side to the other, a braking effort causes the vehicle to yaw, i.e., to pivot about a vertical axis. Yawing occurs especially in vehicles which exhibit a positive steering roll radius but may also occur in vehicles having a negative steering roll radius, for example, at high speed and during cold weather. Furthermore, the compensation provided by the negative steering roll radius acts only with a certain delay.

It is an advantageous feature of the present invention that the reduced pressure gradient is additionally made dependent on the vehicle speed in the sense of decreasing the gradient with increasing vehicle speed.

Still another advantageous feature of the invention is to respond to a tendency for a wheel to lock up by initiating a first phase in which the pressure is held constant and which is then followed by a changeover to a reduced pressure gradient. The constant pressure phase may also be made dependent on vehicle speed in the sense of increasing it with increasing vehicle speed. The teaching of the invention may be applied with the aid of a valve having a variable flow cross section, which abruptly changes the cross section when the switchover to the smaller gradient takes place. However, the changeover may also be made by a valve assembly including an inlet valve and an outlet valve in which the pressure gradient is reduced by cycling the inlet valve and making the duty cycle dependent on vehicle speed for fine control. Still other means for executing the gradient change are described in the abovecited publication.

According to the invention, the change of the pressure gradient is annulled if the associated wheel exhibits a tendency to lock up. For this purpose, a digital memory is set when the wheel tends to lock up and is reset when the braking effort terminates. While set, the memory blocks the changeover to a reduced pressure gradient. The place of the memory may be taken by a timing circuit which is triggered by the signal that indicates a wheel-lock tendency and which then generates a blocking signal for a predetermined period of time.

The invention will be better understood as well as further objects and advantages thereof become more apparent from the ensuing detailed description of a preferred exemplary embodiment taken in conjunction with the drawing.

BRIEF DESCRIPTION OF THE DRAWING

FIG. 1 is a block circuit diagram of an exemplary embodiment of the invention; and FIG. 2 is a timing diagram illustrating the function of the apparatus of FIG. 1.

DESCRIPTION OF THE PREFERRED EMBODIMENT

Turning now to FIG. 1, there will be seen a block diagram of a control system for controlling the braking pressure at the wheels of one vehicle axle and including wheel transducers 1 and 2 associated, respectively, with the two wheels of the axle, which monitor the rotation characteristics of the wheel and apply signals dependent thereon to signal processors 3 and 4, respectively. These signal processors are of known construction and are described, for example, in U.S. Pat. Nos. 3,976,860 or 3,754,797. They generate output signals which define deceleration ($-b$), acceleration ($+b$) and slippage ($\lambda$) and apply these signals to logical circuits 5, 6 respectively, also of known construction and described in for example U.S. Pat. No. 3,754,797. The logical circuits 5 and 6 generate control signals for the brake pressure valve assemblies 9 and 10 after a suitable amplification by power amplifiers 7, 8. Each channel includes a pulse generator 11, 12 whose duty cycle is adjustable under the control of an input signal. The control channels further include timing elements 13,14; 15, 16; and 17, 18, as well as logical gating circuitry to be described in detail below and consisting of AND gates 19, 20 and OR gates 21, 22 and 23, 24. The interconnection of the various elements is as illustrated in FIG. 1 and the function of the circuit illustrated in FIG. 1 is as follows: If the vehicle in question travels on a road surface on which the wheel adhesion coefficients are different for the two wheels on opposite sides of the axle, and if the vehicle is subjected to heavy braking, one of the wheels will tend to lock up so that one of the transducers, for example, the transducer 2, will generate a signal at a time $t_1$ (FIG. 2) which is processed by the circuits 4 and 6 and results in the application of an actuating signal for the outlet valve A in the valve assembly 10, resulting in a braking pressure reduction. The same signal, however, is also applied to the timing elements 13 and 15, which are assumed to have equal time constants. The timing circuit 15 generates an immediate output signal for a time period $T_1$. This signal passes through the OR gate 23, the AND gate 19 and the OR gate 21 to the inlet valve E of the valve assembly 9 and thereby blocks any further pressure increase for the other wheel for a time period equal to $T_1$. This process is plotted in FIG. 2, in which the pressure for both channels is shown as a function of time. Up to the point $t_1$, the pressure increase is equal for both wheels. Thereafter, the pressure is held constant at one wheel for a time $T_1$ and is varied at the other wheel. Subsequent to the time $T_1$, the output signal from the timing element 15 vanishes and the output of the timing element 13 exhibits a signal which turns on the pulse generator 11. The generator 11 then puts out pulses of a pulse width $T_3$, which cause actuation of the inlet valve E in the valve assembly 9 for a number of consecutive intervals which result in a pressure increase with a reduced average rate or slope. This reduced gradient may then be still further varied in dependence on vehicle speed by altering the ratio $T_3/T_2$ in dependence on vehicle speed by changing the duty cycle of the pulse generator on the basis of a speed signal (for example, $T_3/T_2$ proportional to the vehicle speed $v_F$). If the transducer 1 associated with the other wheel also indicates a tendency to lock, the outlet valve A of the valve assembly 9 is actuated, triggering the timing element 17, which generates a signal for a predetermined period of time (for example, 500 msec), which blocks the AND gate 19, so that, during this period of time which substantially corresponds to the length of a normally occurring control process, the reduced gradient is no longer switched on.

It will be appreciated that, if the first occurrence of brake lockup occurs at the wheel associated with the transducer 1, the entire above-described process will occur in a corresponding manner, inasmuch as the coupling between the two channels is entirely symmetrical.

The foregoing relates to a preferred exemplary embodiment of the invention, it being understood that other embodiments and variants thereof are possible within the spirit and scope of the invention.

What is claimed and desired to be secured by Letters Patent of the United States is:

1. An anti skid control system for a wheeled vehicle, comprising:
   a pair of brake pressure control channels with one of said pair of brake pressure control channels associated with each opposite wheel on one axle,
   each said brake pressure control channel including a wheel speed transducer for generating an output signal related to the rotation of an individual wheel,
   each said output signal being applied to a signal processor, said signal processor directing at least one output signal to a logical circuit which produces an output signal which actuates a brake pressure control valve assembly which controls the brake pressure applied to said individual wheel,
   each of said brake pressure control channels including means for varying the rate of increase of braking pressure,
   the two control channels associated with the wheels on opposite sides of one vehicle axle being interconnected and including means reducing the rate of increase of the braking pressure in the other channel when one of the wheels tends to lock up,
   means for varying the reduction of the rate of increase of the braking pressure as a function of vehicle speed, the rate of increase of braking pressure decreases with increasing vehicle speed, and
   switching means for initiating a constant pressure phase upon the occurrence of a tendency of one of the wheels to lock up and prior to the switchover to the reduced rate of pressure increase.

2. An anti skid system according to claim 1, comprising means for changing the constant pressure phase in dependence on vehicle speed; whereby the constant pressure phase is increased with increasing vehicle speed.

3. An anti skid system according to claim 1, wherein said brake pressure control valve includes an inlet valve and an outlet valve and wherein each of said control channels includes a signal pulse generator for cyclic actuation of said inlet valve.

4. An anti skid system according to claim 3, wherein the duty cycle of said signal pulse generator may be varied in dependence on the vehicle speed.

5. An anti skid system according to claim 1, further comprising means for preventing the reduction of the rate of braking pressure increase in a wheel exhibiting a tendency to lock up.

6. An anti skid system according to claim 5, further comprising a signal memory having at least two states, said signal memory being placed into one of said states when the associated wheel tends to lock up and being placed into a second state at the termination of braking effort and wherein an output signal of said signal memory in its first state is applied as a blocking signal preventing the changeover to a reduced rate of increase of the braking pressure.

7. An anti skid system according to claim 5, further comprising a timing member which is triggered by a signal from said logical circuits indicating a tendency to lock and generates for a predetermined period of time a blocking signal serving to prevent the changeover to the reduced rate of pressure increase.

* * * * *